United States Patent [19]

Osborne et al.

[11] 4,316,601
[45] Feb. 23, 1982

[54] QUICK-ADJUSTING JACKSTAND APPARATUS

[75] Inventors: Donald L. Osborne, Quarryville; Joe E. Shriver, New Holland, both of Pa.

[73] Assignee: Sperry Corporation, New Holland, Pa.

[21] Appl. No.: 214,059

[22] Filed: Dec. 8, 1980

[51] Int. Cl.² .............................................. B60S 9/02
[52] U.S. Cl. .............................................. 254/86 R
[58] Field of Search .............. 254/86 R, 98, 101, 102, 254/134; 280/762, 763, 766

[56] References Cited

U.S. PATENT DOCUMENTS

| | | | |
|---|---|---|---|
| 587,274 | 7/1897 | Rve | 254/101 |
| 597,849 | 1/1898 | Heer | 254/101 |
| 2,634,941 | 4/1953 | Eckert | 280/763 |
| 3,189,322 | 6/1965 | Hadek | 254/86 R |
| 3,595,527 | 7/1971 | Douglass | 254/86 R |
| 4,176,824 | 12/1979 | Linton et al. | 254/86 R |
| 4,205,825 | 6/1980 | Stanford | 254/86 R |
| 4,238,113 | 12/1980 | Adams | 254/86 R |
| 4,265,429 | 6/1981 | Formhals | 254/86 R |

Primary Examiner—Robert C. Watson
Attorney, Agent, or Firm—James R. Bell; Frank A. Seemar

[57] ABSTRACT

A quick-adjusting jackstand apparatus is particularly useful on any harvesting attachments. An improved jackstand has a coarse adjustment and a fine adjustment. Coarse adjustment is accomplished by moving the jackstand from a first stored position to a second extended position. A secondary fine adjustment is accomplished by rotating an inner member which is housed in and threadedly engaged with an outer member. Such rotation results in extension of the inner member from the outer member. The threaded engagement of the members is protected from excessive clogging because such threaded engagement is within the outer member.

7 Claims, 6 Drawing Figures

QUICK-ADJUSTING JACKSTAND APPARATUS

BACKGROUND OF THE INVENTION

This invention relates generally to pushing and pulling implements and more particularly to attached vehicle jacks.

Attachments for harvesting machines are detachable therefrom and thus require means for adjusting the height of the attachment at the end where the attachment and harvesting machine become connected.

Such means are generally referred to as jackstands which generally comprise relatively movable components usually interconnectably threaded so that up and down height adjustment results from rotating movement of one threaded member relative to another member. Basically, therefore, such jackstands function similarly to the well known automobile jack.

These jackstands have limitations in that they are usually not adapted for quick coarse adjustment, they are easily prone to having their threaded parts clogged or jammed with dirt or crop debris and they are usually confined to a limited space making access and operation difficult.

The foregoing illustrates limitations of the known prior art. Thus, it is apparent that it would be advantageous to provide an alternative directed to overcoming one or more of the limitations as set forth above.

SUMMARY OF THE INVENTION

In one aspect of the present invention, this is accomplished by providing a quick-adjusting jackstand apparatus including means for coarse and fine adjustment. The coarse adjustment is accomplished by movement of a first member relative to a support. The fine adjustment is accomplished by rotating a second member threadedly engaged within said first member. Thus, the second member can be extended from or retracted into the first member.

The foregoing and other aspects will become apparent from the following detailed description of the invention when considered in conjunction with the accompanying drawings. It is to be expressly understood, however, that the drawings are not intended as a definition of the invention but are for the purpose of illustration only.

DESCRIPTION OF THE PREFERRED EMBODIMENT

Figure 1:
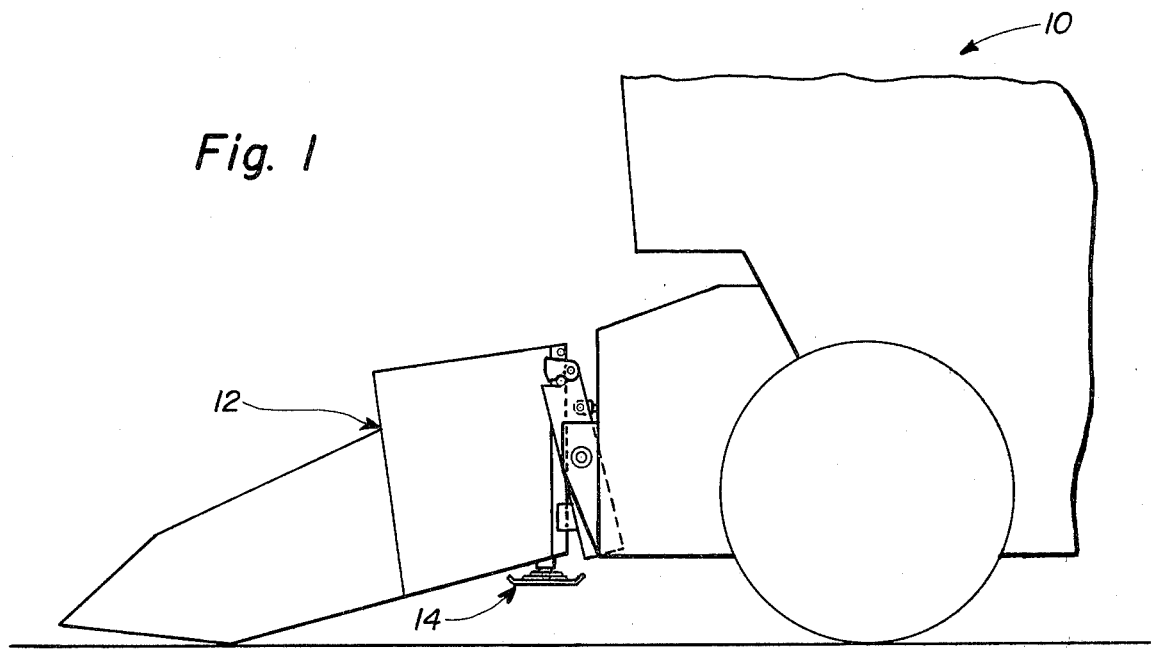
FIG. 1 is a partial side elevational view illustrating an embodiment of the jackstand apparatus of this invention in combination with a self-propelled harvesting machine connected to a harvesting attachment.

In FIG. 1, an exemplary self-propelled harvesting machine, generally designated 10, is connected to a harvesting attachment 12 which includes a pair of jackstand apparatus 14, only one of which is shown and described.

Figure 2:
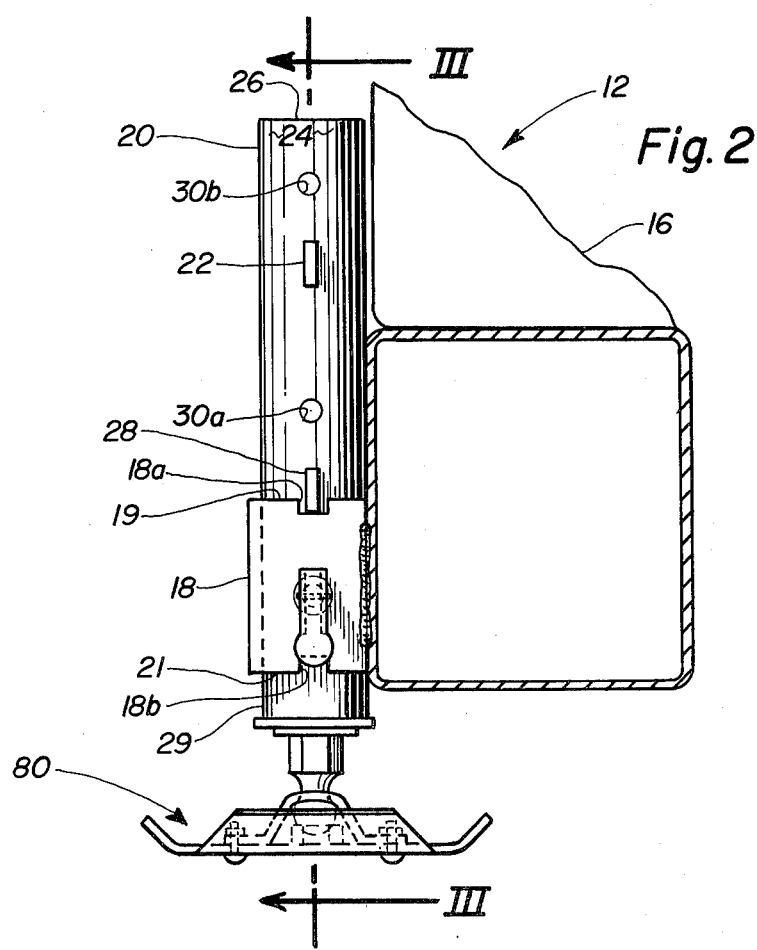
FIG. 2 is a side elevational view in partial cross-section illustrating an embodiment of the jackstand apparatus of this invention connected to a frame portion of a harvesting attachment.
Figure 5A:
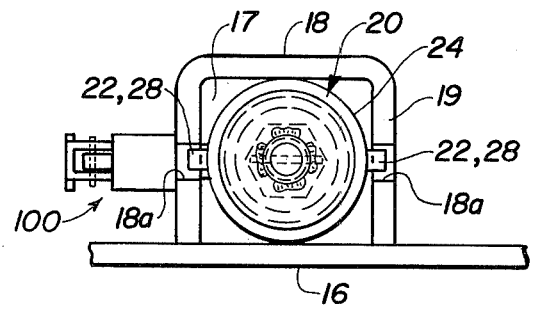
FIGS. 5a and 5b are plan views of an embodiment of the jackstand apparatus of this invention taken along line V—V of FIG. 3.
Figure 5B:
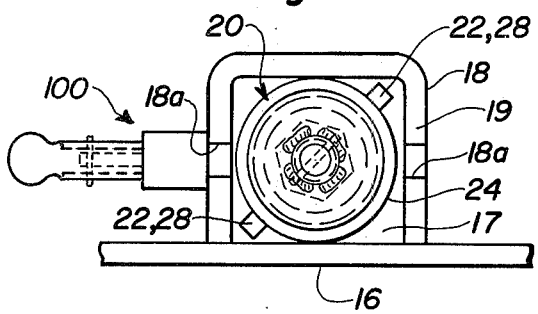

In FIG. 2, a frame portion 16 of attachment 12 provides a support for jackstand apparatus 14. A suitable steel support member 18 is fixedly attached to frame 16 preferably by welding. Support member 18 is provided to form a rectangularly shaped passageway 17 for jackstand 14, see also FIGS. 5a and 5b. A pair of opposed notches 18a are formed in a first end 19 of support member 18. Another pair of opposed notches 18b are formed in a second end 21 of support member 18.

Figure 3:
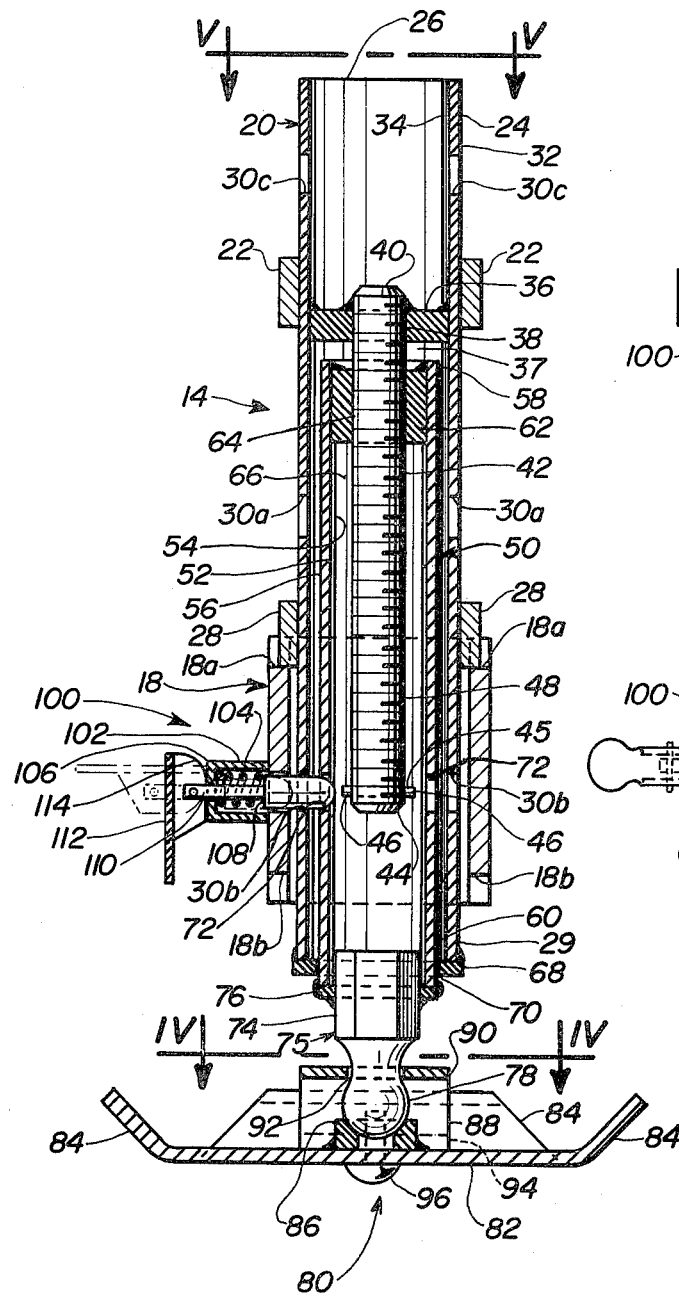
FIG. 3 is a cross-sectional side elevational view illustrating an embodiment the jackstand apparatus of this invention taken along line III—III of FIG. 2.

Jackstand 14, FIGS. 2 and 3, generally comprises a first member 20, preferably a steel tubular member. A pair of ears 22 preferably steel, are connected such as by welding to an outer peripheral surface 24 of first member 20 and located adjacent a first end 26 of member 20. Another pair of such ears 28 are similarly connected to surface 24 adjacent a second end 29 of member 20. The ears 22,28 protrude radially outwardly from member 20 in opposite directions and they are aligned along surface 24. A plurality of opposed apertures are provided through wall 32 of member 20 thus joining outer surface 24 with an inner peripheral surface 34. A pair of 30a of such apertures are between ears 22 and 28 whereas another pair 30b of such apertures are between ears 28 and second end 29 of first member 20. A further pair 30c of such apertures are provided between ears 22 and first end 26. An annular steel member 36 is preferably welded to inner surface 34 of member 20 adjacent ears 22. An annular bore 38, formed in member 36, receives an end 40 of steel threaded rod 42 in welded engagement with member 36. A transverse steel stop pin 45 is fixedly secured in end 44 of rod 42 so as to protrude at opposite ends 46 radially outwardly beyond outer periphery 48 of rods 42. Members 20 and 36 form an annular cavity 37 and rod 42 extends along the centroidal axis of cavity 37.

A second member 50, FIG. 3, is also preferably a steel tubular member having an outside diameter sufficiently less than the inside diameter of first member 20 such that second member 50 is freely movable and storable within cavity 37 of first member 20. Member 50 has a wall 52 with an inner peripheral surface 54 and an outer peripheral surface 56. Wall 52 extends between a first end 58 and a second end 60. An annular steel member 62 is preferably welded to inner surface 54 adjacent first end 58. A threaded bore 64 extends through the centroidal axis of member 62 for receiving threaded rod 42. Members 50 and 62 form an annular cavity 66 and rod 42 extends into cavity 66. A steel washer 68 is preferably welded to second end 29 of member 20. Inner diameter 70 of washer 68 is of a size sufficient to guide member 50 and to permit member 50 to extend from and retract into cavity 37 of member 20 while simultaneously limiting debris from entering cavity 37 between inner surface 34 of member 20 and outer surface 56 of member 50. A pair of opposed apertures 72 are provided through wall 52 thus joining outer surface 56 and inner surface 54. Apertures 72 are positioned adjacent second end 60 such that they can be radially aligned with apertures 30b of member 20 when member 50 is retracted into cavity 37 as is best illustrated in FIG. 3.

Second end 60 of member 50 includes a steel grip member 75 having a hexagonal rod portion 74 preferably secured to member 50 via a welded interconnection with a steel washer 76 thus limiting debris from entering cavity 66. Grip member 75 extends from member 50 to form a spherical or rounded portion 78 formed therewith. Thus when a wrench or the like is secured to hexagonal rod 74, second member 50 is rotated on threaded rod 42 for extending member 50 from and retracting member 50 into cavity 37.

Figure 4:
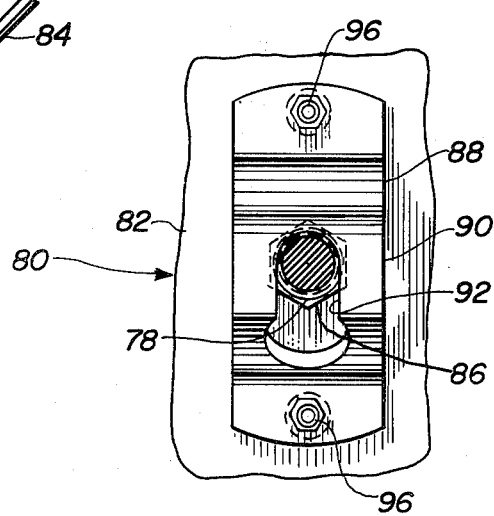
FIG. 4 is a plan view illustrating an embodiment of a portion of the jackstand base of this invention taken along line IV—IV of FIG. 3.

A supportive base 80, FIGS. 3 and 4, is preferably a steel plate 82 including a plurality of side portions 84 extending upwardly and outwardly therefrom. A receptacle 86 is preferably welded to plate 82 at the geometric center thereof and is of a construction sufficient for movably receiving rounded portion 78. A generally "U" shaped steel plate 88 has a raised portion 90 including a slot 92 for detachably receiving rounded portion 78. A pair of opposed flanges 94 formed with plate 88 provide for an appropriate connection of plate 88 with base 80 via bolts 96.

A locking member 100, FIGS. 2, 3, 5A and 5B, is connected to support 18 and includes a spring chamber 102 for retaining a resilient member such as a steel spring 104 compressed between a flange 106 of chamber 102 and a shoulder 108 formed on a steel locking pin 110. A latch 112 is pivotally connected to pin 110. Latch 112 includes a rounded surface 114 which engages chamber 102 for moving pin 110 into and out of engagement with members 20 and 50. Pin 110 is of a construction sufficient for extending through any one of the apertures of the pairs 30a, 30b, or 30c, and when apertures 72 are aligned with apertures 30b, pin 110 can simultaneously extend through an aperture of the pair 30b and an aligned aperture of the pair 72.

With the parts assembled as set forth above, it should be noted that there is a relationship between the locaton of ears 22,28, apertures 30a, 30b, 30c, 72 and notches 18a, 18b. Thus, jackstand 14 is connected to attachment 12 in a first or storage position wherein member 50 is retracted into member 20, ears 28 are supported in notches 18a and pin 110 is simultaneously extended into one of the apertures 30b and 72. When it is desired to move jackstand 14 from the first position to a second position for a coarse adjustment, this is accomplished by pivoting latch 112 for removing pin 110 from apertures 30b, 72 and lifting jackstand 14 upwardly to a position where ears 28 are clear of notches 18a. Jackstand 14 is then rotated about 45 degrees to a position, best shown in FIG. 5B wherein, ears 28 can be moved through passageway 17 and can be rotated back into alignment with notches 18b, ears 28 can be inserted into notches 18b and pin 110 is automatically resiliently urged into one of the apertures 30a. In this position, pin 110 engages outer surface 56 of member 50.

If desired, each coarse adjustment may be made to a greater degree. That is, ears 28 and 22 can be passed through passageway 17 and then ears 22 can be inserted into notches 18b and pin 110 is automatically urged into one of the apertures 30c. In this position pin 110 does not engage outer surface 56 of member 50 since member 36 limits the movement of member 50 within member 20.

Once coarse adjustment is accomplished, fine adjustment can be carried out by gripping rod 74 with a wrench and rotating member 50 on rod 42 until member 50 is extended a desired distance out of member 20. The rounded portion 78 seated in receptacle 86 permits rotation when base 80 is engaged with an adjacent ground surface. Reversal of the above-mentioned procedure can be followed to store the jackstand 14.

The foregoing has described a quick-adjusting jackstand apparatus adapted for quick coarse adjustment, not prone to becoming clogged or jammed and easily operable within confined spaces. It should be realized that the jackstand apparatus of this invention has many possible applications, including but not limited to agricultural machinery and attachments. Also, it should be noted that the length of the jackstand apparatus and the number and placement of adjustment positions can be varied to suit many uses and desires.

It is anticipated that aspects of the present invention other than those specifically defined in the appended claims, can be obtained from the foregoing description and the drawings.

Having thus described the invention, what is claimed is:

1. A jackstand apparatus comprising:
   means for coarse adjusting said jackstand, said coarse adjusting means including a first member movable on a support between a first and a second position;
   means for fine adjusting said jackstand, said fine adjusting means including a second member threadably engaged within said first member, said second member being extendable from and retractable into said first member;
   a supportive base;
   means for rotating said second member relative to said first member and relative to said base, said rotating means including a grip member connected to and protruding from said second member and further including a rounded portion received by said base;
   a first pair of ears connected adjacent a first end of said first member, said first ears protruding radially outwardly from said first member in opposite directions;
   a second pair of ears connected adjacent a second end of said first member, said second ears protruding radially outwardly from said first member in opposite directions and being aligned with said first ears;
   said support has a pair of opposed notches formed therein, said notches being of a construction sufficient for receiving a pair of ears; and
   said support includes a locking member, said locking member being resiliently urged into engagement with said first member.

2. The jackstand apparatus of claim 1 wherein said first and second members each include an alignable aperture formed therein, said apertures being of a construction sufficient for receiving said locking member.

3. The jackstand apparatus of claim 1 wherein said support is of a construction sufficient for engaging said first pair of ears in said first position and said second pair of ears in said second position.

4. The jackstand apparatus of claim 1 wherein said support forms a rectangular passageway and said first member is tubular.

5. The jackstand apparatus of claim 4 wherein said first member is movable between said first and second positions in response to disengagement of one pair of said ears from said support and rotation of said first member to a position wherein said one pair of ears pass unobstructed through said rectangular passageway and subsequent rotation of said first member to a position wherein another pair of said ears engage said support.

6. The jackstand apparatus of claim 1 wherein said rounded portion is removably received by said base.

7. In combination with a harvester attachment, a quick-adjusting jackstand apparatus comprising:
- a support mounted on said attachment, said support having notches formed therein and forming a rectangular passageway with said attachment;
- a tubular first member including a first pair of ears adjacent a first end and a second pair of ears adjacent a second end, said ears protruding radially outwardly from said first member in opposite directions, said first and second pairs of ears being aligned, said first member being movable for coarse adjustment of said jackstand from a first position, wherein one pair of said ears engage said notches, to a second position wherein another pair of said ears engage said notches, said first member being movable from said first to said second position in response to disengagement of said one pair of ears from said notches and rotation of said first member to a position wherein said one pair of ears pass unobstructed through said rectangular passageway and subsequent rotation of said first member to a position wherein said another pair of ears engage said notches;
- means for fine adjustment of said jackstand, said means including a second member in threaded engagement with said first member for rotating extension therefrom;
- a supportive base;
- means for rotating said second member relative to said first member and relative to said base, said rotating means including a grip member connected to and protruding from said second member and further including a rounded portion received by said base; and
- said support includes a locking member, said locking member being resiliently urged into engagement with said first member.

* * * * *